United States Patent [19]

Deschamps

[11] Patent Number: 5,288,091
[45] Date of Patent: Feb. 22, 1994

[54] FOUR WHEEL STEERING APPARATUS

[75] Inventor: Joe Deschamps, Jackson, Tenn.

[73] Assignee: Noma Outdoor Products, Inc., Jackson, Tenn.

[21] Appl. No.: 11,302

[22] Filed: Jan. 29, 1993

[51] Int. Cl.$^5$ .................................. B62D 7/15
[52] U.S. Cl. ...................... 280/91; 280/99; 280/100
[58] Field of Search ................ 280/91, 99, 100

[56] References Cited

U.S. PATENT DOCUMENTS

| | | | |
|---|---|---|---|
| 1,228,980 | 6/1917 | Smith | 280/91 |
| 1,585,753 | 5/1926 | Arato | 280/99 |
| 2,234,888 | 3/1941 | Blagden | 280/91 |
| 2,319,880 | 5/1943 | Pulleyblank | 280/91 |
| 2,411,570 | 11/1946 | Hawkins | 280/91 |
| 3,596,730 | 8/1971 | Cecce | 280/91 |
| 4,295,657 | 10/1981 | Sano et al. | 280/91 |
| 5,048,853 | 9/1991 | Trefz et al. | 280/91 |

FOREIGN PATENT DOCUMENTS

| | | | |
|---|---|---|---|
| 2032372 | 1/1971 | Fed. Rep. of Germany | 280/99 |
| 523655 | 7/1940 | United Kingdom | 280/99 |
| 523656 | 7/1940 | United Kingdom | 280/99 |
| 523660 | 7/1940 | United Kingdom | 280/99 |

Primary Examiner—Mitchell J. Hill
Attorney, Agent, or Firm—Heiskell, Donelson, Bearman, Adams, Williams & Caldwell

[57] ABSTRACT

A four wheel steering system for a vehicle which significantly reduces or eliminates scrubbing of the outside tires. A preferred embodiment is specially adapted for use on riding lawn mowers, and includes a longitudinally moveable cam plate having a pair of cam slots formed therein, each slot engaging an individual steering arm for separately steering each rear wheel. The cam plate is coupled to a sector gear which reciprocates in response to left and right hand movement of a steering wheel, with the sector gear interconnecting the front and rear wheel steering mechanisms. The slots in the cam plate are specially configured to vary the turning angles of the rear wheels so that the wheels turn through varying angles, thereby reducing scrubbing to an acceptable level. In a preferred embodiment, all four wheels may be calibrated to turn about a single point, thereby completely eliminating scrubbing.

14 Claims, 6 Drawing Sheets

[#] FOUR WHEEL STEERING APPARATUS

BACKGROUND OF THE INVENTION

1. Field

The present invention relates to four wheel steering apparatus for vehicles and, more particularly, to a steering system specially adapted for riding lawn mowers which varies the steering angles of the wheels to significantly reduce scrubbing during a turn.

2. Description of the Prior Art

It is generally well known in the riding lawn mower industry that maintaining congruent turning angles for both the inner and outer wheels frequently causes the outer wheel to skid during a turn. Such skidding is typically referred to as "scrubbing", and is generally known to those skilled in virtually any area involving the steering of four wheeled vehicles. It is particularly troublesome when associated with riding lawn mowers, however, for scrubbing tends to damage or even destroy the underlying grass, which is an acutely unacceptable consequence.

Riding mower manufacturers have, for a number of years, alleviated the problem of scrubbing for front wheel steering systems by utilizing specially configured four-bar linkages or other generally conventional means to vary the turning angles between inner and outer wheels. On more sophisticated mowers utilizing four wheel steering systems, however, it has heretofore been difficult and expensive to provide a steering system which eliminates scrubbing of the rear wheels, or at least reduces scrubbing to an acceptable level. The physical constraints imposed by a typical rear wheel and axle assembly prevents the use of conventional scrub eliminating linkages as used for front wheel steering systems, thereby necessitating the complete redesign of the rear end and the use of costly custom components to achieve acceptable rear wheel steering. With the advantages and increasing popularity of riding mowers incorporating four wheel steering systems, particularly those with anti-scrubbing features, the high cost associated with rear wheel steering systems has recently become a significant concern.

BRIEF SUMMARY OF THE INVENTION

It is a primary object of the present invention to provide a unique steering system for a vehicle, specially adapted for use on riding lawn mowers, which reduces or eliminates scrubbing of the wheels while the vehicle is turning.

Another object of this invention is to provide an apparatus for steering the rear wheels of a vehicle about a common turning point.

A further object is to provide a system for steering the rear wheels of the vehicle through unequal angles.

A still further object is to provide a cost effective steering system for riding mowers which reduces scrubbing of the rear wheels to an acceptable level, and which is adapted for use within the confines of a generally conventional rear end assembly.

In order to achieve the above and other objects, the present invention comprises an apparatus for controlling the steering of both the front and rear wheels of a four wheeled vehicle in response to movement of a steering input member, i.e., a steering wheel. Steering of the front wheels is accomplished by a generally conventional sector gear operatively connected to a front drag link which turns the front wheels. Steering of the rear wheels is accomplished by a rear drag link, also operatively connected to the sector gear, which moves a cam plate longitudinally in response to rotational movement of the sector gear. The cam plate engages a pair of individual steering arms, one for each rear wheel. The caming end of each steering arm engages a separate slot formed in the cam plate, wherein the slot contour determines the independent pivotal movement of each rear wheel in response to longitudinal movement of the cam plate.

These and other objects of the present invention will become apparent upon reading the following detailed description in conjunction with the accompanying drawings.

DETAILED DESCRIPTION OF THE PREFERRED EMBODIMENT

The preferred embodiment of the present invention disclosed herein comprises a four wheel steering system adapted for use on a riding lawn mower. Such lawn mowers are commonly referred to as either lawn tractors or garden tractors, so all such terms are as considered to be interchangeable for purposes of this invention. It is to be expected, however, that the principals of this invention may be applicable to virtually any wheeled vehicle, regardless of the nature of the vehicle or the number of wheels.

It is to be noted in the specification set forth herein below, similar components may be identified by a single reference numeral distinguished by the suffixes "R" or "L", which will be understood as denoting the right or left side of the vehicle, respectively. Such components occur in pairs, with one being either identical to, or the mirror image of, the other.

Figure 1:
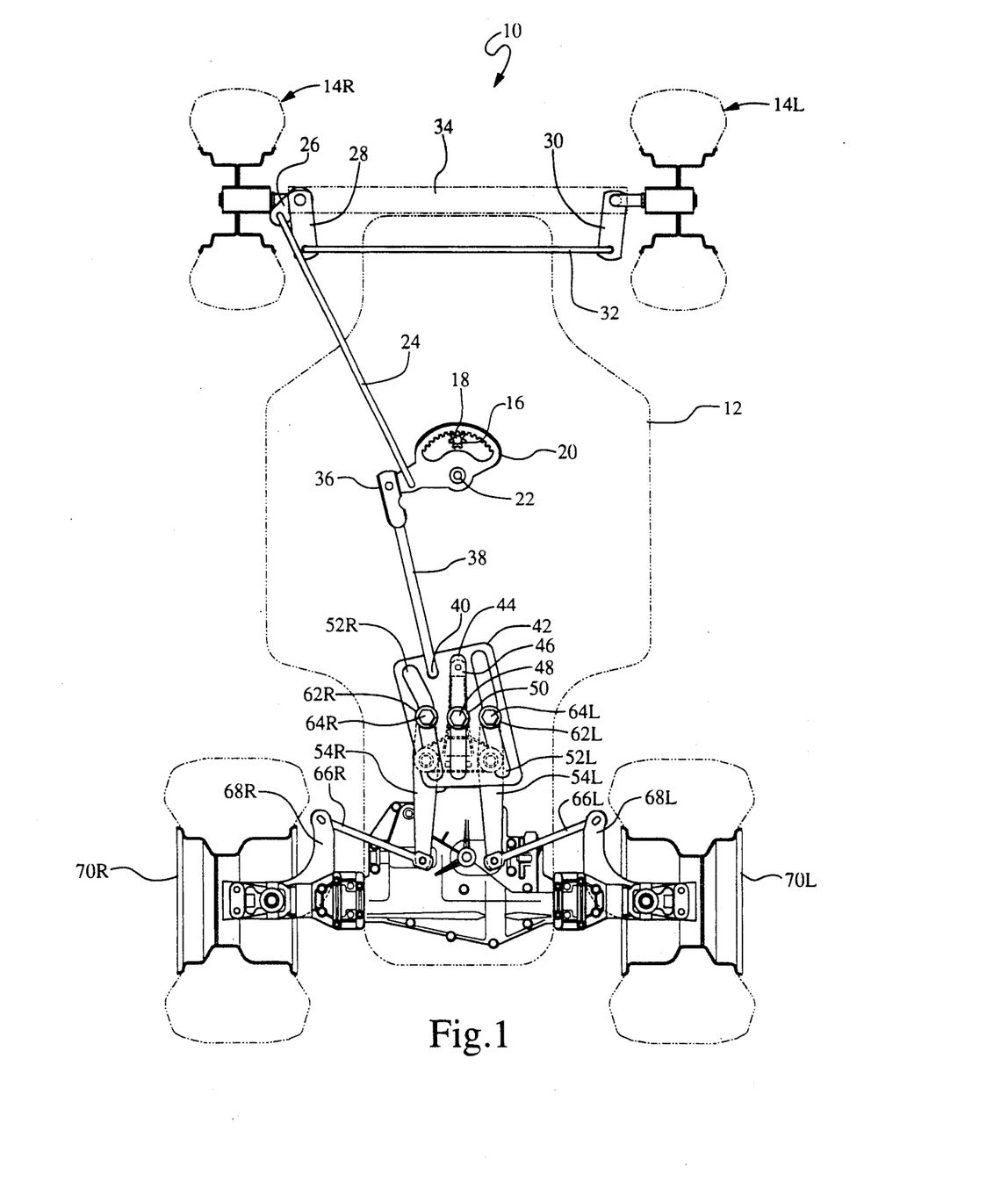
FIG. 1 is a bottom plan view of the four wheel steering system of the present invention.

Referring initially to FIG. 1, a vehicle 10 is shown embodying the preferred embodiment of this invention. Vehicle 10 comprises a generally conventional frame member 12, shown in phantom, which serves as a mounting structure for the novel components of this invention. Mounted in a generally conventional manner at the front of frame 12 are front wheels 14R and 14L. A pinion gear 16 is attached to a steering shaft 18 which extends upward through frame 12 and is attached to a steering wheel (not shown) or other conventional steering input mechanism. A sector gear 20 is attached to frame 12 and operatively engages pinion gear 16. Sector gear 20 is pivotable about shaft 22 upon rotation of pinion gear 16 which, in turn, rotates with steering shaft 18 upon rotation of the steering wheel by the operator of vehicle 10. Sector gear 20 then reciprocates in response to left and right hand rotation of the steering wheel and, in this invention, further serves the function of interconnecting the front and rear wheel steering mechanisms, as described more fully below.

Figure 7:
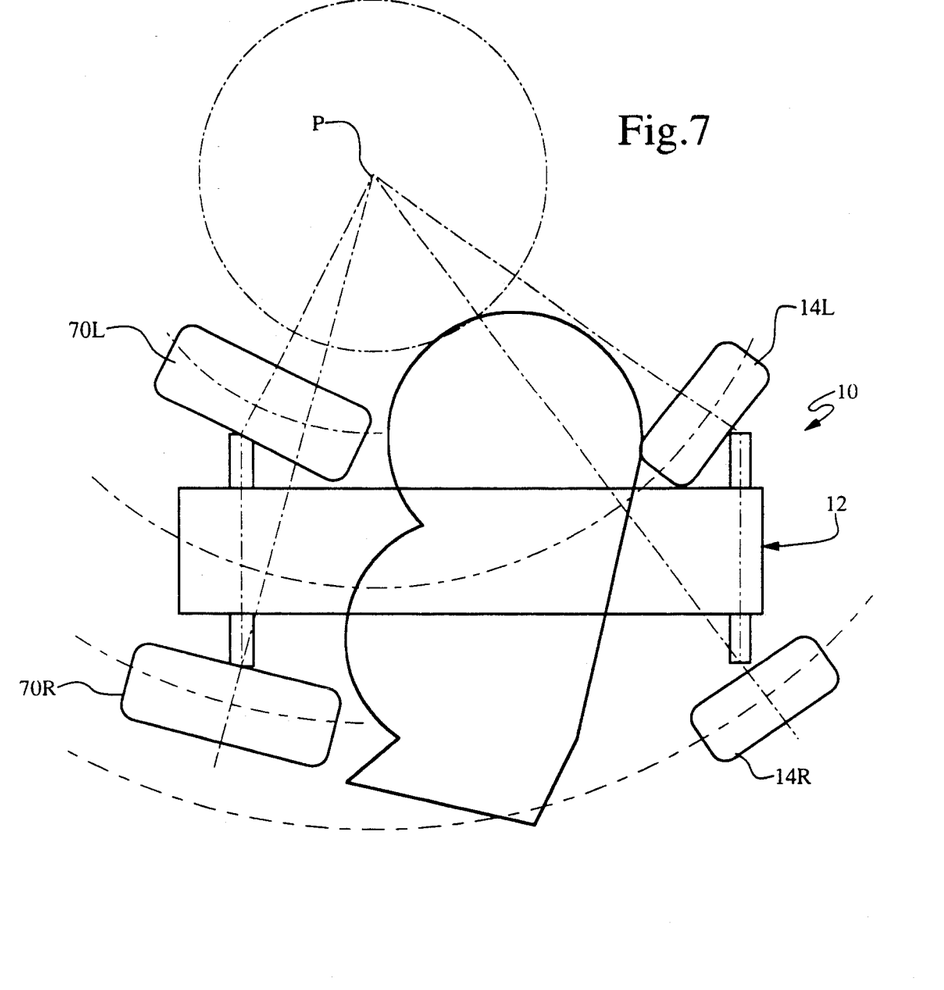
FIG. 7 is a diagram showing the preferred geometric orientation of the wheels of a vehicle incorporating the preferred embodiment of this invention during a left hand turn.

One end of front drag link 24 is attached to sector gear 20, while the opposite end is attached to link 26. Links 28 and 30 and tie rod 32, together with front axle 34, form a four-bar linkage which serves to steer front wheels 14R and 14L in a conventional manner. The geometry of links 26, 28, and 30 will be fully understood to those skilled in the art to be adapted to turn wheels 14R and 14L about a substantially common turning point, as shown in FIG. 7. Since the primary focus of the present invention lies in the unique configuration of the rear wheel steering apparatus, the steering of front wheels 14R and 14L will not be discussed in detail herein. It is to be understood that the principals of the present invention will not be affected by variations in the front wheel steering apparatus, and that the front wheel steering system shown and discussed herein is by way of example only.

The leading end 36 of rear drag link 38 is suitably attached to sector gear 20, and the trailing end 40 is suitably attached to cam plate 42, thereby interconnecting the front and rear wheel steering systems in this invention. Cam plate 42 has a centrally located longitudinal slot 44 formed therethrough for slidably mounting cam plate 42 to the underside of frame 12. Support bracket 46 is bolted or otherwise fixed to the underside of frame 12, with cam plate 42 being attached thereto by shoulder bolt 48 disposed vertically through central slot 44 and engaging a threaded hole in frame 12. Flanged roller 50 fits concentrically about the shoulder portion of shoulder bolt 48, and provides a suitable bearing surface for engaging slot 44 to facilitate the longitudinal sliding movement of cam plate 42 in response to rotation of sector gear 20.

Contoured cam slots 52 and 54 are formed in cam plate 42, disposed on either side of central slot 44. Steering arms 54R and 54L are pivotably mounted to support bracket 46 by posts 56 being retained within bosses 58 by conventional retaining means. The leading ends 60 of steering arms 54R and 54L have flanged rollers 62R and 62L secured thereto, preferably by means of shoulder bolts 64R and 64L. Rollers 62R and 62L are retained within slots 52R and 52L, respectively, and are operative to follow the profile of said cam slots upon longitudinal movement of cam plate 42. The trailing ends of steering arms 54R and 54L are attached to the first ends of tie rods 66R and 66L, with the second ends of tie rods 66R and 66L being secured to steering brackets 68R and 68L. As will be fully understood to those skilled in the art, lateral rotation of steering brackets 68R and 68L results in corresponding pivotal movement of rear wheels 70R and 70L about their respective vertical axes for purposes of steering vehicle 10.

Those skilled in the art will recognize that the transaxle and other major components of the rear end assembly shown herein (other than those specifically used for steering) are generally conventional, and have not been significantly modified for purposes of this invention. The high degree to which non-customized components are employed represents a unique advantage offered by the present invention over known prior art rear wheel steering systems having anti-scrubbing features. While the use of a standard transaxle or any other component is certainly not critical to the teachings of this invention and should in no way be deemed a limitation on the scope of coverage to which this invention is entitled, it will be appreciated that the preferred embodiment of vehicle 10 utilizes many standard components to achieve a significant cost advantage over other known vehicles having acceptable scrub reducing rear wheel steering systems.

Figure 2:
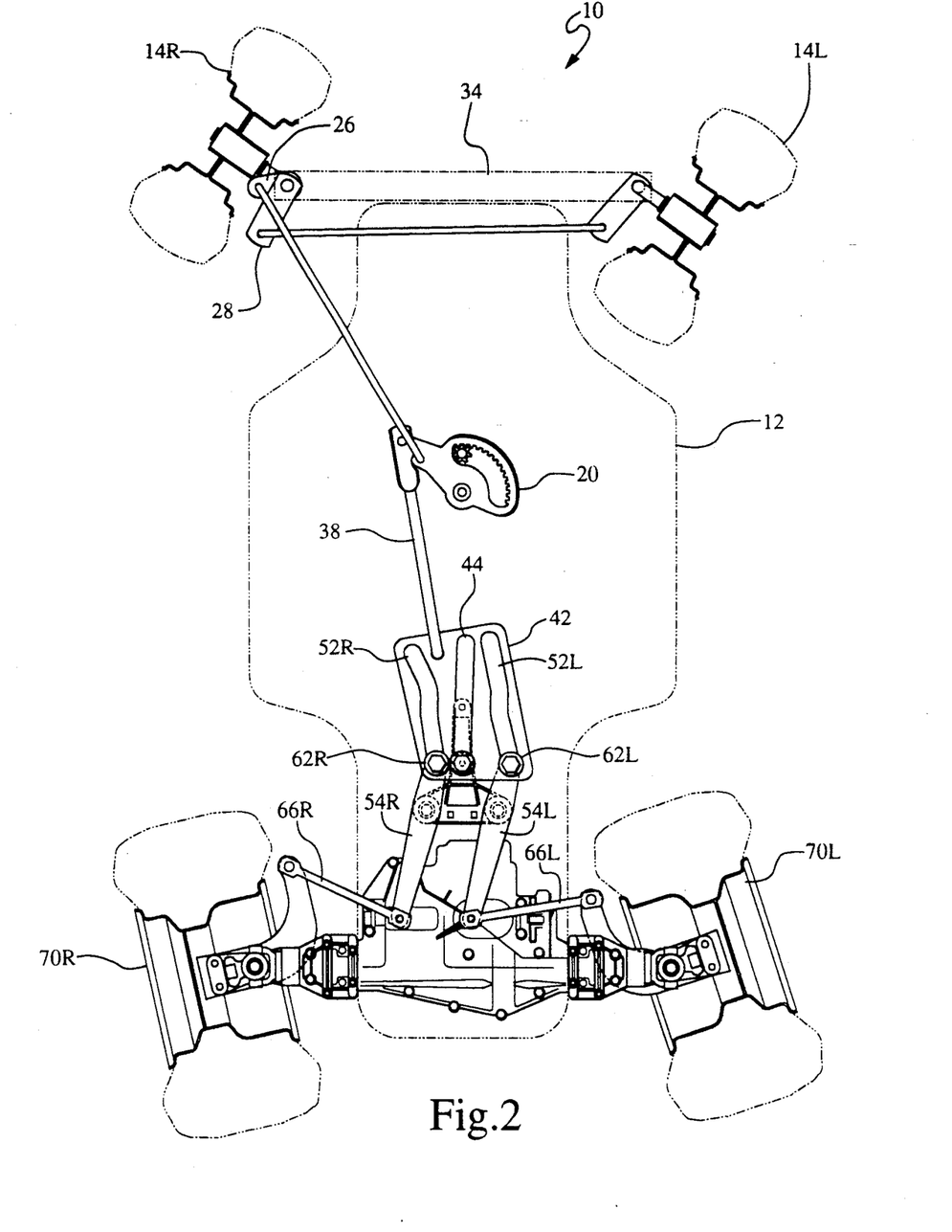
FIG. 2 is a bottom plan view similar to FIG. 1, showing the system in its full left hand turn orientation.
Figure 3:
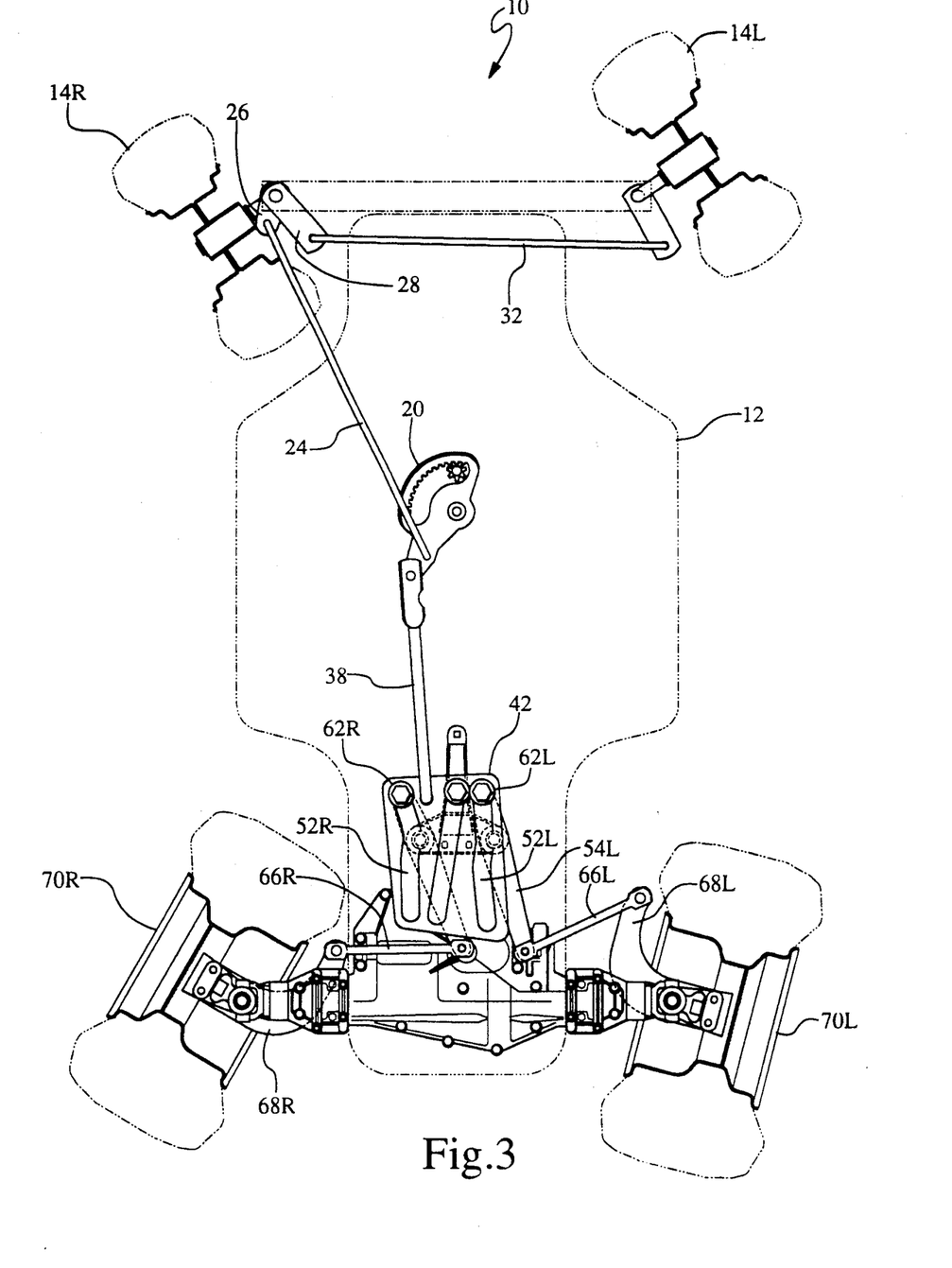
FIG. 3 is a bottom plan view similar to FIG. 1, showing the system in its full right hand turn orientation.
Figures 4, 5:
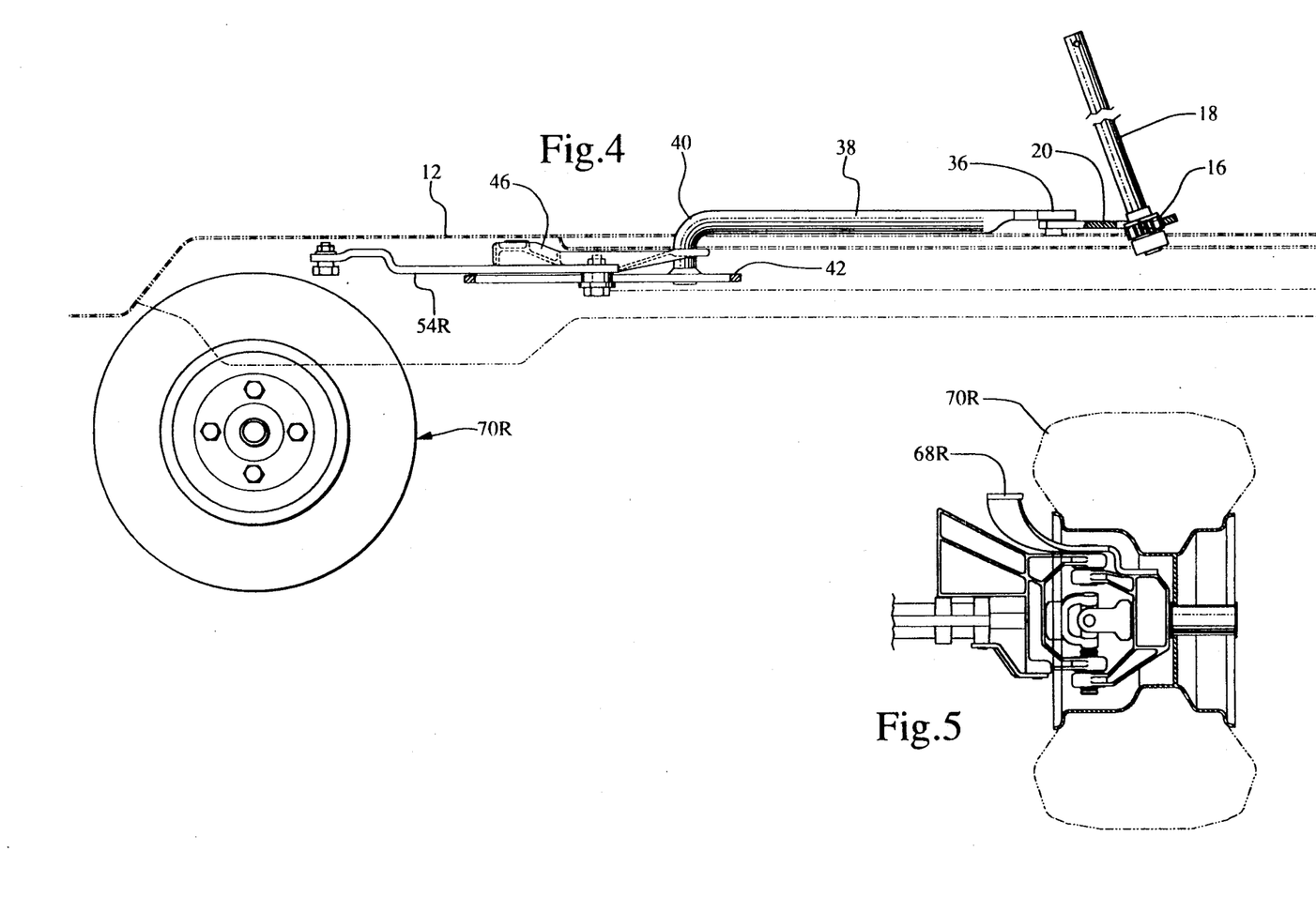
FIG. 4 is an enlarged side elevational view of the rear wheel steering portion of the system.
FIG. 5 is a rear fragmentary view of the right hand rear wheel assembly of the present invention.
Figure 6:
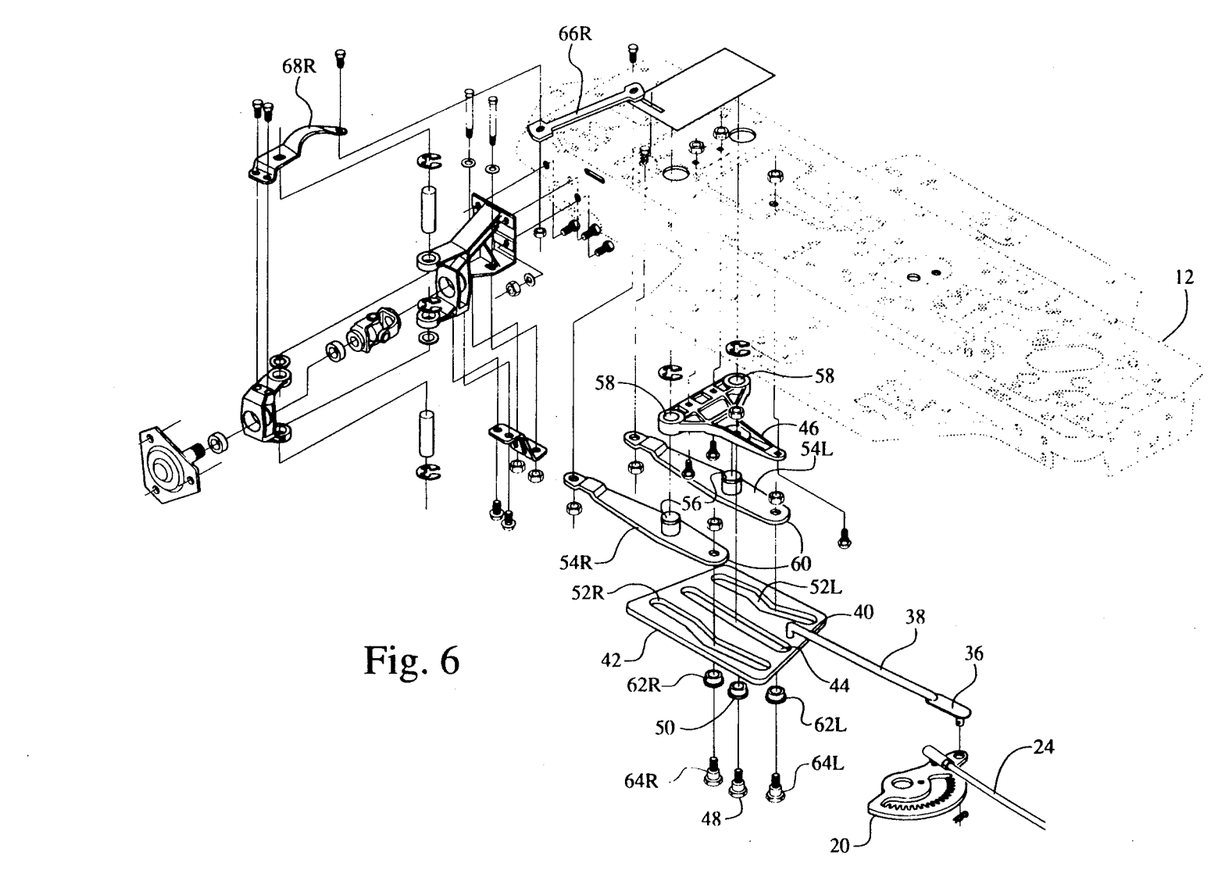
FIG. 6 is an exploded view of the rear wheel steering portion of the present invention.

The operation of the unique rear wheel steering system of the present invention is most easily understood upon reviewing FIGS. 2 and 3. In FIG. 2, the steering system of this invention is shown with vehicle 10 in a full left-hand turn. Left-hand rotation of the steering wheel by the operator moves sector gear 20 as shown, so that rear drag link 38 pulls cam plate 42 longitudinally to its forward-most position. Flanged rollers 62R and 62L, being operative to serve as cam follows, move laterally according to the respective contours of slots 52R and 52L. Lateral movement of flanged rollers 62R and 62L and leading ends 60 of steering arms 54R and 54L secured thereto results in pivotal movement of steering arms 54R and 54L in a substantially horizontal plane. Such pivotal movement of steering arms 54R and 54L is translated into lateral movement of tie rods 66R and 66L, and consequential rotation of brackets 68R and 68L resulting in pivotal steering movement of rear wheels 70R and 70L. As shown in FIG. 3, a right-hand turn of apparatus 10 results in cam plate 42 being pushed to its rearwardmost position by rear drag link 38, with the remaining components being operative to steer rear wheels 70R and 70L in the opposite direction in the same manner as described above. Slight rotation of cam plate 42 may be tolerated, and should not appreciably affect the operation of the present system.

By carefully designing the configuration of cam plate 42 and, in particular, the contour of cam slots 52R and 52L, depending upon the geometric variables applicable to apparatus 10, the steering system of the present invention may be uniquely adapted to achieve the results shown in FIG. 7. As those skilled in the art will readily understand, each wheel of a four wheeled vehicle follows a separate actual path when the vehicle turns through any given radius. Each wheel will also have its own rolling path, represented by a curve with which the longitudinal axis of the wheel maintains a tangential relationship throughout the turn. When the rolling path coincides with the actual path as shown in FIG. 7, scrubbing is eliminated. When the actual and rolling paths differ, as is inherently the case when laterally opposed wheels are maintained parallel to one another, scrubbing naturally occurs.

As shown in FIG. 7, the present invention allows coincidence between the actual path and the rolling path for each wheel of the vehicle, so that the turn center P of the vehicle is also the center of each wheel's rolling path. Theoretically, there may be an optimum point P for any given vehicle which should serve as the turning center for all four wheels to maximize performance depending on the particular operating criteria for the vehicle. It will be understood, however, that for practical reasons the natural turning point of the front wheels will normally be determined first, and the rear wheels calibrated accordingly. This has been found to be the most economical method of achieving the primary objectives of the present invention.

This invention provides a system for eliminating, or at least minimizing, rear wheel scrubbing by carefully designing cam plate 42 according to the geometric parameters for any given vehicle. It will be appreciated by those skilled in the art that, in the context of riding lawn mowers, it is not essential, or always feasible, to achieve absolute perfection with this system. Slight deviations between the actual path and rolling path for one or more wheels may be present, yet scrubbing reduced to an acceptable level. It is conceivable that the dimensions of the vehicle or the operating criteria may indeed make it unacceptably difficult to obtain absolute perfection in the steering system. The degree to which scrubbing is reduced may be varied as desired or as is practical under the circumstances.

While a four wheel steering system specially adapted to eliminate scrubbing in riding lawn mowers has been made clear from the above specification, it is to be expressly understood that the principles of the present invention may be applied to many systems other than the preferred embodiment described herein. In particular, the use of a cam plate and steering arm may be equally applicable to a system used to steer either the front or rear wheels of a vehicle steered exclusively by two wheels. The scope of protection to which this invention is entitled should be limited only by the prior art and the following claims.

What is claimed is:

1. Apparatus for controlling the steering of the front and rear wheels of a four-wheeled vehicle in response to movement of a steering input member, wherein laterally opposed wheels comprise inside and outside wheels during turning of said vehicle, said apparatus comprising:

interconnecting means, operatively connected to said steering input member and rotatable in response to movement thereof;

front wheel steering means having at least one front link assembly attached to said front wheels and said interconnecting means, said front link assembly being adapted to translate rotational movement of said interconnecting means into pivotal movement of said front wheels; and rear wheel steering means comprising a pair of rear link assemblies independently connected to each of said rear wheels, each of said rear link assemblies having a steering arm with a first end operatively communicating with said interconnecting means and moveable in response to rotation thereof, and a second end connected to a tie rod assembly, said tie rod assembly being connected to one of said rear wheels wherein lateral movement of said tie rod assembly effects pivotal movement of said rear wheel; wherein rotation of said interconnecting means is translated into angular movement of said rear wheels by said rear wheel steering means such that, during at least a portion of the total angular movement of said rear wheels, the angular movement of said inside wheel is not equivalent to the angular movement of said outside wheel, thereby reducing slippage of said rear wheels relative to the ground.

2. A steering apparatus as set forth in claim 1, wherein said rear wheel steering means further comprises:

a plate member connected to said interconnecting means and substantially longitudinally moveable in response to rotational movement thereof, said plate member having a pair of cam slots formed therein, said first end of each of said steering arms having a follower member operatively disposed in one of said cam slots; and each of said steering arms is pivotally mounted to said vehicle at a point intermediate said first and second ends thereof, said steering arms being pivotal about independent parallel vertical axes; wherein the contours of said cam slots are adapted to cause lateral movement of said first ends of said steering arms in response to longitudinal movement of said plate member, thereby pivoting said steering arms and causing lateral movement of said second ends thereof, resulting in angular movement of said rear wheels.

3. A steering apparatus as set forth in claim 1, wherein the angular movement of said inside wheel is less than the angular movement of said outside wheel in response to a specified degree of movement of said steering input member, thereby substantially eliminating slippage of said outside wheel.

4. A steering apparatus as set forth in claim 3, wherein the difference between the angular displacement of said inside and outside wheels increases in direct relation to degree of angular movement of said rear wheels.

5. A steering apparatus as set forth in claim 2, wherein:

said plate member further includes a longitudinal slot formed therein; and said vehicle includes a generally rigid frame having a roller member mounted to the underside thereof and engaging said longitudinal slot, thereby allowing said plate member to slide substantially longitudinally in response to rotational movement of said interconnecting member.

6. A steering apparatus as set forth in claim 2, wherein:

said interconnecting member comprises a sector gear having first and second links connected thereto and extending therefrom, said first link being operatively connected to said front link assembly, and said second link being connected to said plate member.

7. Apparatus for steering at least two wheels of a multi-wheeled vehicle, said vehicle having a steering input member and a generally horizontal frame with first and second laterally spaced wheels operatively secured thereto, said first and second wheels being angularly pivotal about substantially vertical axes, said apparatus comprising:

a reciprocating member engaging said steering input member and operative to move in response to movement thereof;

a link having a first end secured to said reciprocating member and a second end extending therefrom, operative to move substantially longitudinally upon movement of said reciprocating member;

a plate member attached to said second end of said link, slidably mounted to said frame and longitudinally moveable upon movement of said link, said plate member having at least one longitudinal contoured slot formed therein; and first and second steering arms each having a first end portion engaging said at least one slot, operatively connected to said first and second wheels whereby said wheels pivot angularly in response to lateral movement of said steering arms, wherein said at least one slot is adapted to drive said steering arms laterally in response to longitudinal movement of said plate member, thereby steering said first and second wheels.

8. Apparatus as set forth in claim 7, wherein:

said plate member includes a central longitudinal slot, and is mounted to said frame by roller means secured to said frame and operatively engaging said central longitudinal slot.

9. Apparatus as set forth in claim 7, wherein:
said plate member has two said contoured slots formed therein, said first end portions of said steering arms engaging a separate one of said slots.

10. Apparatus as set forth in claim 9, wherein:
the configuration of said two contoured slots is adapted such that the degree of pivotal movement of said first wheel varies from the degree of pivotal movement of said second wheel in response to longitudinal movement of said plate member.

11. Apparatus as set forth in claim 10, wherein:
the degree of movement of said first wheel is greater than the degree of movement of said second wheel when said first wheel is the inside wheel during turning of said vehicle.

12. Apparatus as set forth in claim 7, wherein:
said vehicle has four wheels; and
said apparatus is adapted to steer said four wheels in response to movement of said steering input member.

13. Apparatus as set forth in claim 7, wherein:
said first and second steering arms are pivotally secured to said frame, each having a second end attached to a tie rod operatively engaging pivoting means for said first and second wheels, respectively, whereby lateral movement of said first end portions of said steering arms results in lateral movement of said second ends thereof in the opposite direction, thereby driving said tie rods and effecting the angular movement of said first and second wheels.

14. Apparatus for simultaneously steering front and rear wheels of a four-wheeled vehicle, said vehicle having a frame and a steering input member, said apparatus comprising:
a reciprocating member engaging said steering input member and operative to move in response to movement thereof;
a front drag link having a first end secured to said reciprocating member and a second end operatively engaging front wheel steering means;
a rear drag link having a first end secured to said reciprocating member and a second end extending rearwardly therefrom, operative to move substantially longitudinally upon movement of said reciprocating member;
a plate member attached to said second end of said rear drag link, slidably mounted to said frame and longitudinally moveable upon movement of said rear drag link, said plate member having at least two longitudinal contoured slots formed therein; and
first and second steering arms pivotally mounted to said frame, each having a first end portion engaging one of said slots, operatively connected to said rear wheels whereby said rear wheels are steered in response to pivotal movement of said steering arms,
said slots being adapted to pivotally move said steering arms in response to longitudinal movement of said plate member, thereby steering said rear wheels.

* * * * *